(12) United States Patent
Liu et al.

(10) Patent No.: US 12,112,230 B2
(45) Date of Patent: Oct. 8, 2024

(54) ELECTRONIC PAPER DISPLAY, LOGISTICS BOX AND LOGISTICS STATE MANAGEMENT METHOD

(71) Applicant: E Ink Holdings Inc., Hsinchu (TW)

(72) Inventors: Chuen Jen Liu, Hsinchu (TW); Liang Yu Yan, Hsinchu (TW); Jia Hong Xu, Hsinchu (TW); Zhone Yang Wu, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 18/299,721

(22) Filed: Apr. 13, 2023

(65) Prior Publication Data

US 2023/0385579 A1   Nov. 30, 2023

Related U.S. Application Data

(60) Provisional application No. 63/365,412, filed on May 26, 2022.

(51) Int. Cl.
*G06K 7/14* (2006.01)
*G09G 3/34* (2006.01)

(52) U.S. Cl.
CPC .......... *G06K 7/1413* (2013.01); *G09G 3/344* (2013.01); *G09G 2330/02* (2013.01)

(58) Field of Classification Search
CPC ..... G06K 7/1413; G06K 7/00; G06K 7/10861
USPC .................... 235/462.01, 454, 375
See application file for complete search history.

(56) References Cited

U.S. PATENT DOCUMENTS

| 5,949,484 A * | 9/1999 | Nakaya ................ H04N 19/164 375/E7.211 |
| 9,798,907 B2 | 10/2017 | Rinehart et al. |
| 10,535,425 B2 | 1/2020 | Jacobs et al. |
| 2010/0123650 A1* | 5/2010 | Wang .................... G06F 3/1454 345/76 |

(Continued)

FOREIGN PATENT DOCUMENTS

| CN | 109191054 A | 1/2019 |
| CN | 111441672 A | 7/2020 |

(Continued)

OTHER PUBLICATIONS

The office action of corresponding TW application No. 112113839 issued on Mar. 7, 2024.

*Primary Examiner* — Edwyn Labaze
(74) *Attorney, Agent, or Firm* — CKC & Partners Co., LLC

(57) ABSTRACT

An electronic paper display, comprising a carrier device, a memory, a display panel, a sensing device and a processing device. The carrier device is arranged on a logistics box. The memory is arranged on the carrier device, and is configured to store a logistics data. The display panel is arranged on the carrier device, and is configured to generate a control voltage according to the logistics data to adjust a plurality of positions of a plurality of electrophoretic particles. The sensing device comprises at least one sensor, and is configured to sense at least one state parameter of the logistics box to generate at least one sensing signal. The processing device is coupled to the memory, the display panel and the sensing device, and is configured to send the at least one sensing signal through wireless transmission technology.

14 Claims, 5 Drawing Sheets

(56) References Cited

U.S. PATENT DOCUMENTS

| | | | |
|---|---|---|---|
| 2011/0096388 A1* | 4/2011 | Agrawal | G02F 1/163 |
| | | | 29/846 |
| 2015/0097769 A1* | 4/2015 | Russell | A47G 19/2227 |
| | | | 345/545 |
| 2015/0179008 A1 | 6/2015 | Sung et al. | |
| 2018/0190063 A1 | 7/2018 | Feng et al. | |
| 2020/0012998 A1 | 1/2020 | Gillen et al. | |
| 2021/0165979 A1 | 6/2021 | Wilkinson et al. | |
| 2022/0238002 A1* | 7/2022 | Volkerink | G06Q 10/0833 |

FOREIGN PATENT DOCUMENTS

| | | |
|---|---|---|
| CN | 212290802 U | 1/2021 |
| CN | 110294194 B | 12/2021 |
| CN | 114476322 A | 5/2022 |
| TW | I428498 B | 3/2014 |
| TW | 201527631 A | 7/2015 |
| TW | I700651 B | 8/2020 |
| TW | I732417 B | 7/2021 |

\* cited by examiner

ELECTRONIC PAPER DISPLAY, LOGISTICS BOX AND LOGISTICS STATE MANAGEMENT METHOD

CROSS-REFERENCE TO RELATED APPLICATION

This application claims priority to U.S. Provisional Application Ser. No. 63/365,412, filed May 26, 2022, which is herein incorporated by reference in its entirety.

BACKGROUND

Technical Field

The present disclosure relates to a improvement of logistics system, especially an electronic paper display, logistics box and logistics state management method.

Description of Related Art

Logistics refers to an action that circulates commodities in a physical way. Deliver materials, semi-finished products or commodities from a sending place to a receiving place by the procedures of transportation, storage, distribution, etc. With the increase of market demand and delivery quantity, how to effectively control a large number of logistics commodities, especially to ensure the current logistics progress and confirm the current states of commodities, has become an important issue in the current logistics system.

SUMMARY

One aspect of the present disclosure is an electronic paper display, comprising a carrier device, a memory, a display panel, a sensing device and a processing device. The carrier device is arranged on a logistics box. The memory is arranged on the carrier device, and is configured to store a logistics data. The display panel is arranged on the carrier device, and is configured to generate a control voltage according to the logistics data to adjust a plurality of positions of a plurality of electrophoretic particles. The sensing device comprises at least one sensor, and is configured to sense at least one state parameter of the logistics box to generate at least one sensing signal. The processing device is coupled to the memory, the display panel and the sensing device, and is configured to send the at least one sensing signal through wireless transmission technology.

Another aspect of the present disclosure is a logistics box, comprising a box body, a sensing device and an electronic paper display. The sensing device is arranged on the box body, and comprises at least one sensor to sense at least one state parameter of the logistics box to generate at least one sensing signal. The electronic paper display is arranged on a surface of the box body, and is coupled to the sensing device. The electronic paper display is configured to control a plurality of positions of a plurality of electrophoretic particles to display a logistics barcode. The electronic paper display is further configured to send the at least one sensing signal through wireless transmission technology.

Another aspect of the present disclosure is a logistics state management method, comprising: displaying, by an electronic paper display, a logistics barcode, wherein the electronic paper display is arranged on a box body; scanning, by a terminal device, the logistics barcode to obtain a logistics data; connecting, by the terminal device, to a server, and finding a progress data corresponding to the logistics data in the server, so as to selectively update the progress data; sensing, by at least one sensor of a sensing device, at least one state parameter of a logistics box to generate at least one sensing signal; and sending, by a wireless transmission circuit, the at least one sensing signal.

It is to be understood that both the foregoing general description and the following detailed description are by examples, and are intended to provide further explanation of the disclosure as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

For the embodiment below is described in detail with the accompanying drawings, embodiments are not provided to limit the scope of the present disclosure. Moreover, the operation of the described structure is not for limiting the order of implementation. Any device with equivalent functions that is produced from a structure formed by a recombination of elements is all covered by the scope of the present disclosure. Drawings are for the purpose of illustration only, and not plotted in accordance with the original size.

It will be understood that when an element is referred to as being "connected to" or "coupled to", it can be directly connected or coupled to the other element or intervening elements may be present. In contrast, when an element to another element is referred to as being "directly connected" or "directly coupled," there are no intervening elements present. As used herein, the term "and/or" includes an associated listed items or any and all combinations of more.

Figure 1:
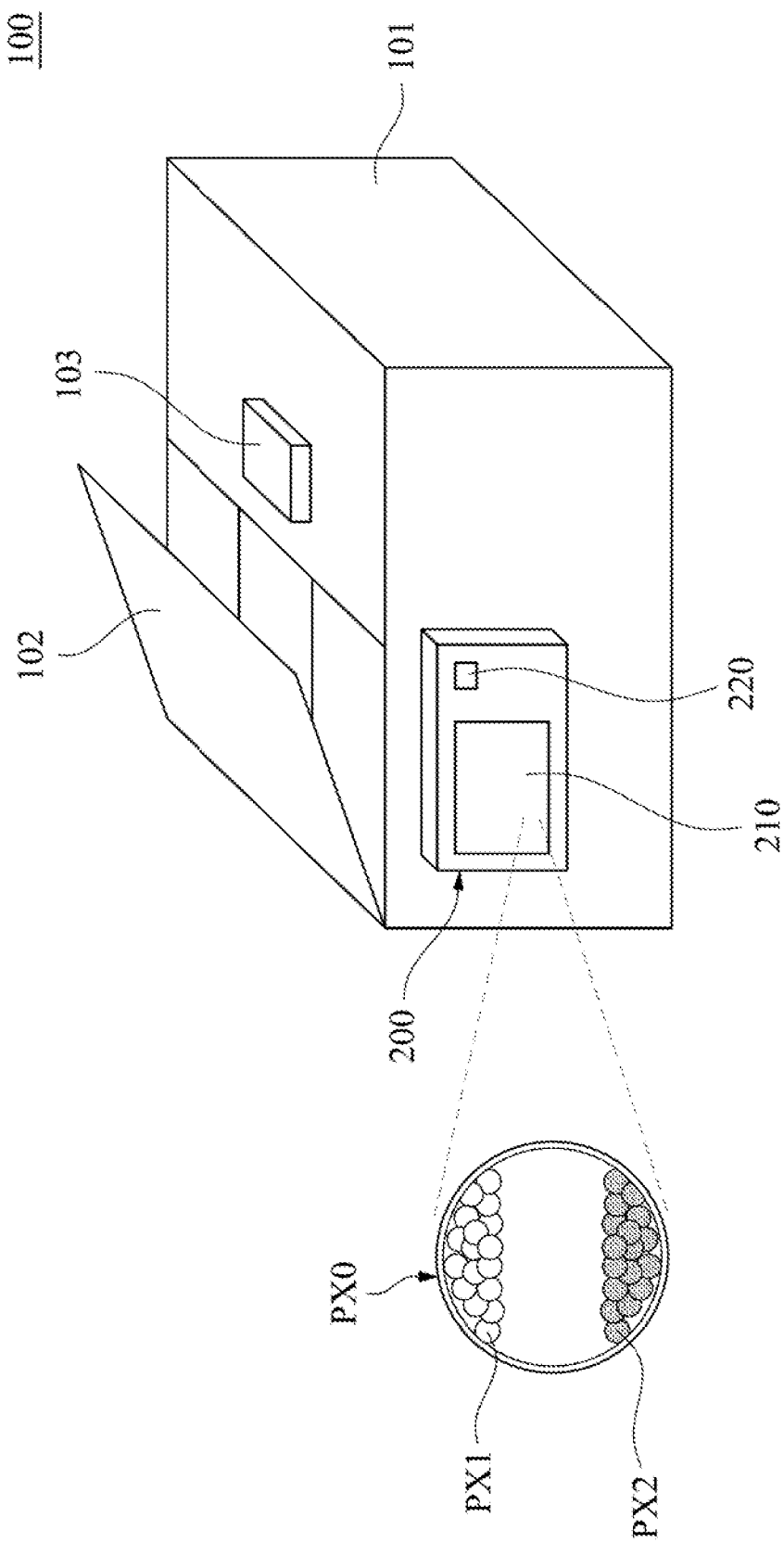
FIG. 1 is a schematic diagram of a logistics box in some embodiments of the present disclosure.

The present disclosure relates to an electronic paper display, a logistics box and a logistics state management method. FIG. 1 is a schematic diagram of a logistics box 100 in some embodiments of the present disclosure. The logistics box 100 is configured with an electronic paper display 200. An interior space of the logistics box 100 is configured to place items. For example, a sender (e.g., seller of online store) puts a item in the logistics box 100, and then delivers the packaged logistics box 100 to the logistician for delivery, The logistician delivers the logistics box 100 to a recipient (e.g., buyer), and the recipient can recycle the logistics box 100 after receiving item.

The logistics box 100 includes a box body 101 and a cover 102. The cover 102 is configured to cover or close the box body 101. In one embodiment, the cover 102 is connected to the box body 101, and can rotate relative to the box body 101 to open or close the logistics box 100. In some other embodiments, the cover 102 can be separated from the box body 101, or fixed to top of the box body 101 to close the logistics box 100. The logistics box 100 can be made of paper, plastic or metal, and its configuration and size can be adjusted arbitrarily according to the logistics requirement.

In some embodiments, the logistics box 100 furhter includes an electronic lock 103 (or smart lock). The electronic lock 103 is arranged on a position corresponding to the box body 101 and the cover 102 on the logistics box 100, so as to selectively fix the box body 101 and the cover 102. In some embodiments, the electronic lock 103 includes bolt (not shown in the figure), and can use wireless transmission technology (e.g., bluetooth, near field communication or Wifi) to receive control signals. When the electronic lock 103 receives a command "lock", the electronic lock 103 controls the bolt to move in one direction to fix the relative position between the cover 102 and the box body 101. When the electronic lock 103 receives a command "unlock", the electronic lock 103 controls the bolt to move in other direction, so that the cover 102 can be removed from the box body 101, or rotate along the box body 101. Structure and control principle of the electronic lock 103 are not limited to the aforementioned methods. Since there are many types of the electronic lock (related technologies such as Taiwan Patent No. I428498 and Patent No. I732417 Patents, Taiwan Publication No. 201527631, but not limited thereto), it will not be described in detail here.

The electronic paper display 200 is arranged on the box body 101 of the logistics box 100, and includes a display panel 210. The display panel 210 has multiple pixel units, each of the pixel units has multiple electrophoretic particles (e.g., electronic ink). The electronic paper display 200 is configured to control positions of the electrophoretic particles, so that the display panel 210 displays a logistics barcode. The electronic paper display 200 futher includes a sensing device 220. The sensing device 220 can be implemented by any one or combination of a gravity sensor, a light sensor, a temperature sensor or a humidity sensor, to sense at least one state parameter (e.g., placement orientation, temperature, humidity, brightness, etc.) The sensing device 220 generates a corresponding sensing signal according to the at least one state parameter is sensed.

As shown in FIG. 1, in one embodiment, the display panel 210 has multiple pixel units PX0 in an electronic ink layer, and the display panel 210 forms an electric field according to a control voltage to adjust positions of multiple electrophoretic particles PX1 and PX2 in the electronic ink layer, thereby presenting different grayscale colors. The electrophoretic particles PX1 and PX2 can be separately encapsulated in multiple microcapsules or microcups, but the electronic ink layer 112 of the present disclosure is not limited to the above structure. Since those skilled in the art can understand the structure and principle of the electronic ink layer, it will not be described in detail here.

The display panel 210 of the electronic paper display 200 is exposed outside the logistics box 100, so that the logistics staff can scan the logistics barcode. The sensing device 220 is arranged on the electronic paper display 200 at a position corresponding to inside of the logistics box 100, and may also be arranged on the electronic paper display 200 at a position corresponding to the outside of the logistics box 100. In some embodiments, the box body 101 of the logistics box 100 is provided with an opening corresponding to the electronic paper display 200, so that the electronic paper display 200 can be embedded in the opening. In other words, one side of the electronic paper display 200 can be exposed to the logistics box 100 for setting the display panel 210 to display the logistics barcode. The other side of the electronic paper display 200 is exposed inside the logistics box 100 for setting the sensing device 220 to sense an internal state (e.g., temperature) of the logistics box 100. In addition, in some other embodiments, the sensing device 220 do not need to be arranged in the same device with the electronic paper display 200. That is, the sensing device 220 can be independently arranged in the logistics box 100, and wired or wirelessly connected to the electronic paper display 200.

Figure 2:
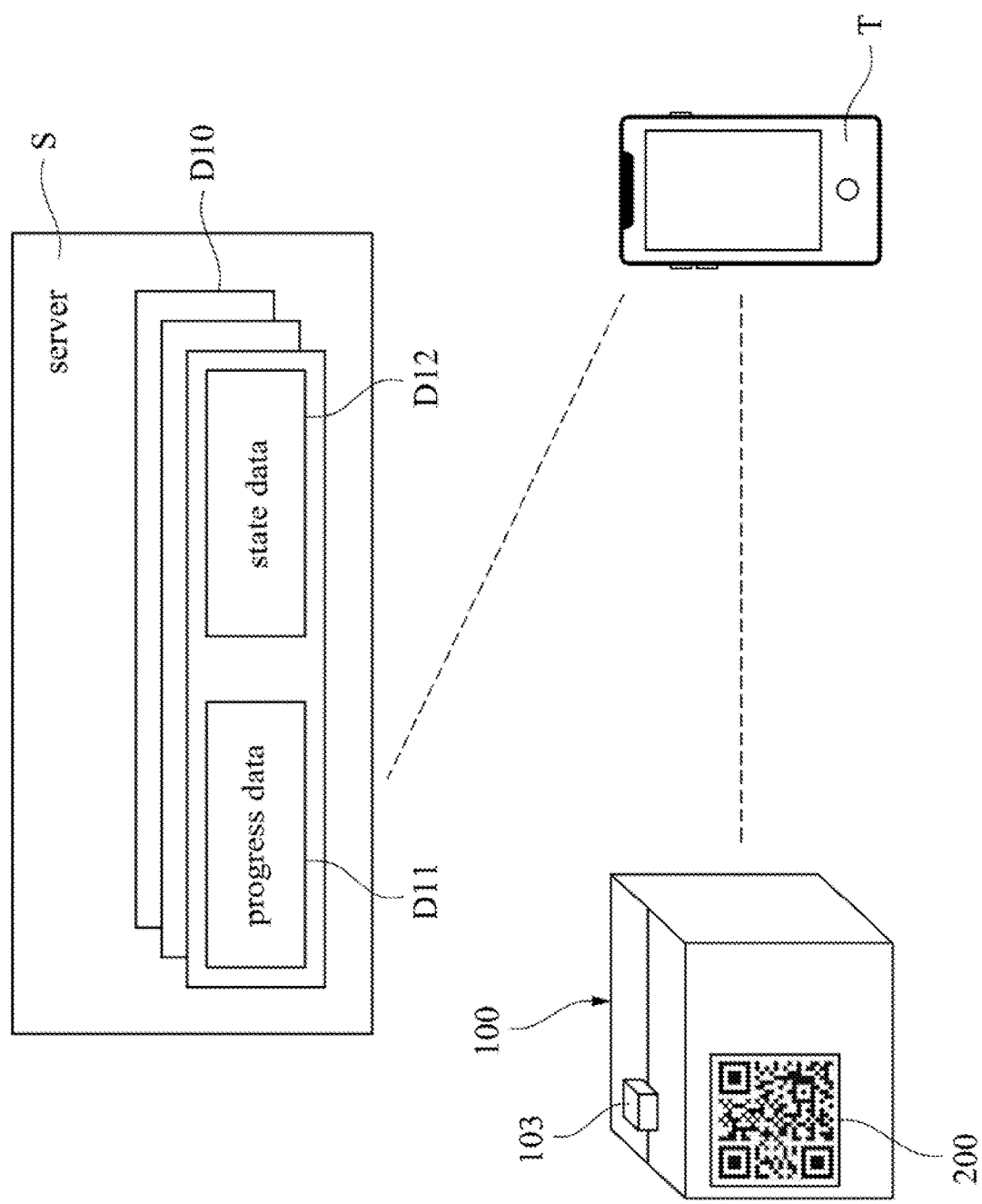
FIG. 2 is a schematic diagram of a logistics system in some embodiments of the present disclosure.

FIG. 2 is a schematic diagram of a logistics system 300 in some embodiments of the present disclosure. The logistics system 300 includes a server S, a logistics box 100, an electronic paper display 200 and at least one terminal device T. In one embodiment, a wireless transmission circuit is arranged in the electronic paper display 200 (not shown in FIG. 1 and FIG. 2). The wireless transmission circuit can use Bluetooth (e.g., Bluetooth beacon), near field communication (Near Field Communication, NFC), Wifi and other transmission technologies to send the sensing signal outward. The wireless transmission circuit can periodically send the sensing signal outward, or continuously send the sensing signal aperiodically. The logistics staff can receive the sensing signal by a terminal device T to confirm a current state of the logistics box 100. Alternatively, surrounding network devices (e.g., network communication devices in the logistics vehicles) can receive the sensing signal, and upload the sensing signal to the server S, so as to update the current state of the logistics box 100 in real time.

Figure 3:
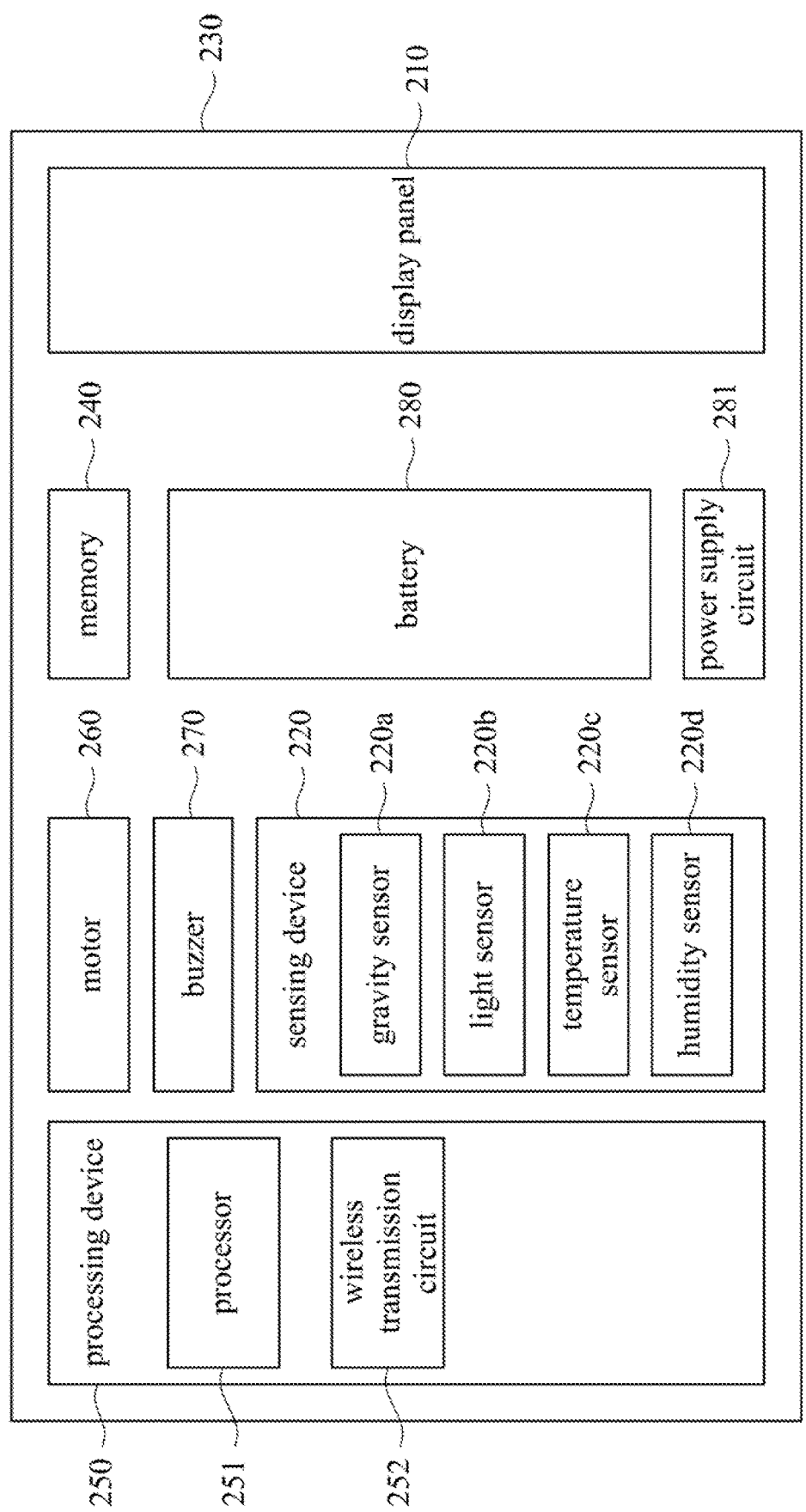
FIG. 3 is a schematic diagram of a structure of electronic paper display in some embodiments of the present disclosure.

FIG. 3 is a schematic diagram of a structure of electronic paper display 200 in some embodiments of the present disclosure. In one embodiment, the electronic paper display 200 includes a carrier device 230, a display panel 210, a sensing device 220, a memory 240 and a processing device 250. The carrier device 230 is arranged on the logistics box 100, so as to carry the display panel 210, the sensing device 220, the memory 240 and the processing device 250. In one embodiment, the carrier device 230 can be a casing for packaging the above components, and fixed or embedded in the box body 101 of the logistics box 100. In some embodiments, the carrier device 230 may be a substrate on which the above-mentioned components are disposed. In some other embodiments, the carrier device 230 may be a packaging material (such as a film) for covering/packaging the above-mentioned components.

As mentioned above, the display panel 210, the sensing device 220, the memory 240 and the processing device 250 are all arranged in the carrier device 230, and are fixed to the box body 101 of the logistics box 100. In addition, the display panel 210 can also be exposed outside the carrier device 230 (or correspond to a transparent area on the carrier device 230) to display the logistics barcode (e.g., two-dimensional barcode). The sensing device 220 can be arranged in the carrier device 230, or arranged on a side of the carrier device 230 corresponding to inside of the box body 101 to sense the state parameter of the logistics box 100. In one embodiment, the sensing device 220 includes any one or more of a gravity sensor (acceleration sensor) 220$a$, a light sensor 220$b$, a temperature sensor 220$c$ or a humidity sensor 220$d$, and is configured to respectively sense placement direction/acceleration value, light, temperature and humidity of the logistics box 100. The sensor type of the present disclosure is not limited to this, in some other embodiments, the sensor can be an infrared sensor, an air pressure sensor, etc., and the number of sensors can be adjusted according to the requirement.

The memory 240 is configured to restore the logistics data. The logistics data includes a logistics box number and a delivery number. In one embodiment, the logistics data further includes a corresponding logistics barcode, the logistics barcode can be generated by the terminal device T or the server S after conversion according to the logistics box number and delivery number, and stored in the memory 240 in advance.

As mentioned above, the display panel 210 is coupled to the memory 240 to obtain the logistics data (or the logistics barcode). The display panel 210 is configured to generate a control voltage according to the logistics data (or the logistics barcode) to adjust positions of the electrophoretic particles, so that each pixel unit can present different gray scales or colors. Accordingly, the logistics barcode can be presented on the display panel 210.

The processing device 250 is coupled to the display panel 210, the sensing device 220 and the memory 240, and includes a processor 251 and a wireless transmission circuit 252. The processor 251 is configured to perform various instructions of the electronic paper display 200, such as storing the logistics data in the memory 240, or controlling the electronic lock 103 to be turned on or off. The wireless transmission circuit 252 is configured to periodically send the sensing signal according to the wireless transmission technology, or be sent continuously aperiodically. In some other embodiments, each component of the electronic paper display 200 may have an independent processor, for example, the display panel 210 has a drive controller to display a logistics code according to the logistics data.

In some embodiments, the electronic paper display 200 further includes a motor 260 and a buzzer 270. The motor 260 and the buzzer 270 is coupled to the processing device 250. When the processing device 250 determines that the sensing signal is abnormal (e.g., exceed an expected range), the processing device 250 is configured to drive the motor 260 and/or the buzzer 270 to generate vibration or reminder sound.

In some embodiments, the memory 240 stores at least one state threshold. The processing device 250 determines whether a value of the sensing signal exceed the state threshold, to selectively drive the motor 260 and/or the buzzer 270.

For example, the state threshold includes "acceleration value X", "brightness Y", "temperature 10° C.", "humidity 50%". If the value of the sensing signal obtained by the sensing device 220 is exceed the state threshold, for example: "acceleration>X", "brightness>Y", "temperature 15° C.", "humidity 65%", it means that the state of the logistics box 100 exceeds the expected state condition. At this time, the processing device 250 drives the motor 260 and/or the buzzer 270, or sends a reminder signal to the terminal device T.

In some embodiments, the memory 240 further stores at least one reminder data, the reminder data can be a specific graphic or a specific color. When the processing device 250 determines whether the value of the sensing signal exceeds the state threshold, the processing device 250 is configured to drive the display panel 210 according to the reminder data, so that the display panel 210 displays a reminder pattern corresponding to the reminder data (e.g., text or pattern of "abnormal temperature", or a red light).

In some embodiments, the electronic paper display 200 further includes a battery 280. The battery 280 is coupled to other components of the electronic paper display 200 (as shown in FIG. 3) to provide power required for operation. In one embodiment, the electronic paper display 200 further has a charging port, so that the charging port of the electronic paper display 200 can be connected to an external power source through a charging cable to charge the battery 280.

As mentioned above, the processing device 250 is coupled to the battery 280 and a power supply circuit 281, to detect (or obtain by the power supply circuit 281) a remaining power of battery 280. The processing device 250 can periodically detect the remaining power. When determining that the remaining power of the battery 280 is lower than a set value (e.g., 20%), the processing device 250 sends a warning signal, or controls the display panel 210 to present a warning message.

In addition to the logistics box 100 and the electronic paper display 200, the present disclosure can also be applied to a logistics system 300 to improve the management method of the logistics system 300. As shown in FIG. 1 to FIG. 3, in one embodiment, the server S stores a plurality of delivery data D10, and each delivery data D10 includes a corresponding progress data D11 and a state data D12. The progress data D11 is configured to record a logistics delivery progress of the logistics box 100 (e.g., "check", "delivery", "receiving"), and the state data is configured to record the state of the logistics box 100 (e.g., temperature).

As described in the foregoing embodiment, the logistics box 100 displays the logistics barcode by the electronic paper display 200, and the logistics staff scans the logistics barcode by the terminal device T to obtain the corresponding logistics data. After obtaining the logistics data, the terminal device T connects to the server S, and compares the logistics data with the delivery data D10 (e.g., compares the delivery number), so as to find a corresponding delivery data D10 and a corresponding progress data D11. At this time, the server S selectively updates the progress data D11. For example: when the server S determines that the logistics data is uploaded by the "logistics staff" (e.g., according to the account, or determined according to a machine code of the terminal device T), the server S updates the progress data D11 from the "check" to "delivery".

Figure 4A:
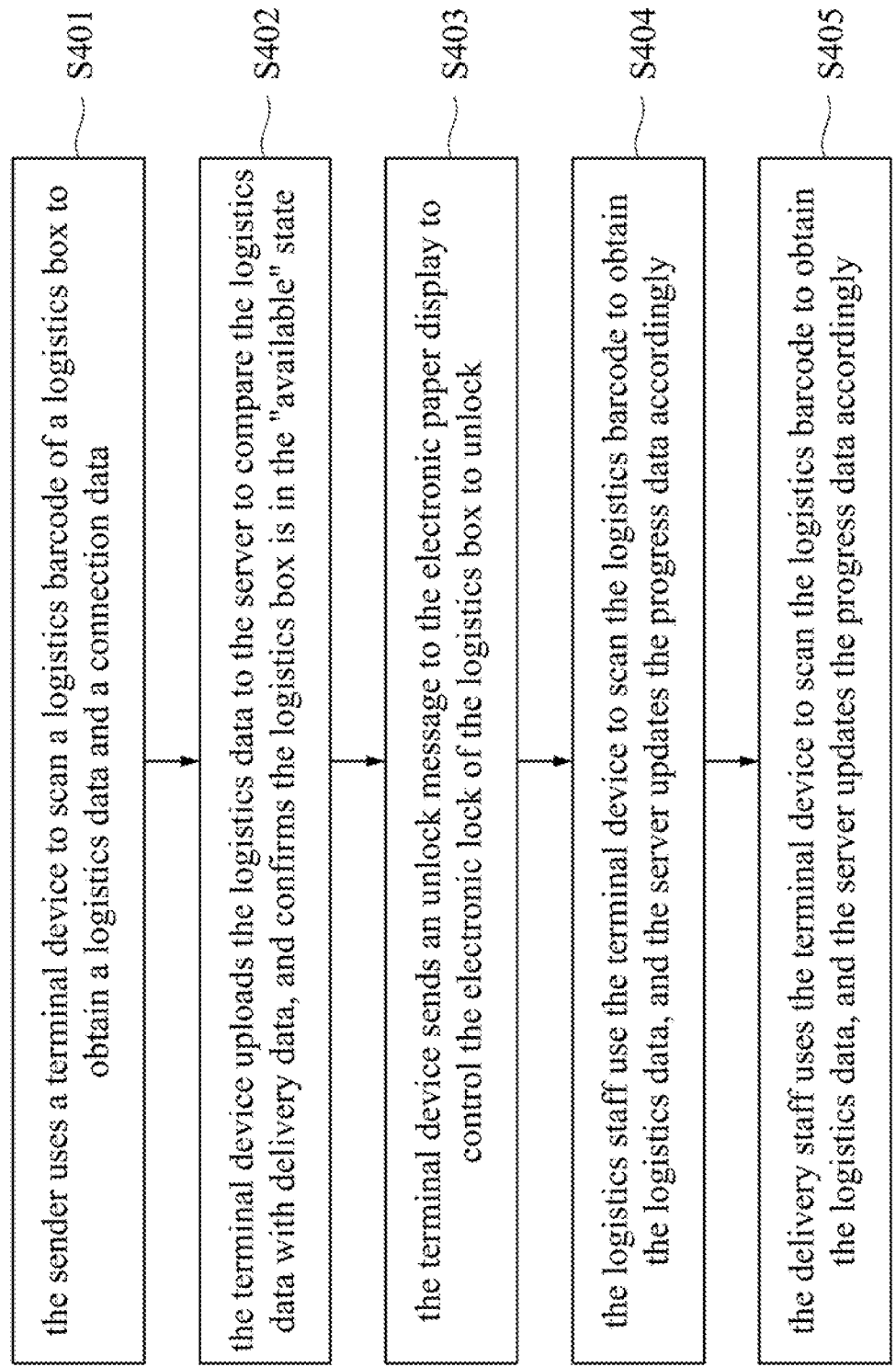
FIGS. 4A-4B are flowcharts illustrating a logistics process in some embodiments of the present disclosure.
Figure 4B:
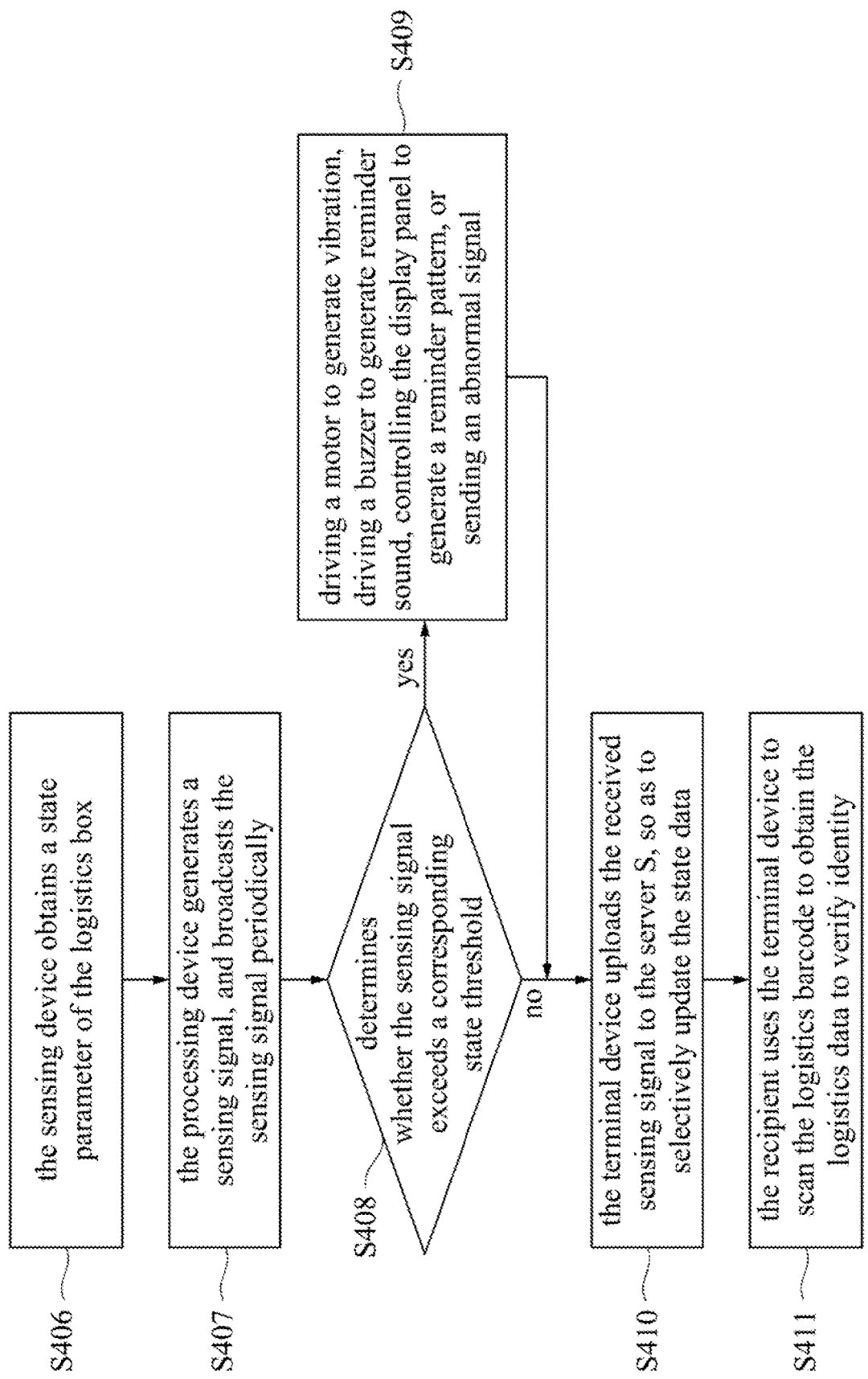

FIGS. 4A-4B are flowcharts illustrating a logistics process in some embodiments of the present disclosure. As shown in FIG. 4A, steps S401~S403 are used to illustrate the "registration process." In step S401, the sender uses a terminal device T to scan a logistics barcode of a logistics box 100 to obtain a logistics data. In some embodiments, when the terminal device T scans the logistics barcode of the logistics box 100, it can also obtain a connection data. The connection data can be bluetooth number, Wifi password and other information, so that the terminal device T can establish a connection with the electronic paper display 200 of the logistics box 100 according to the connection data.

In step S402, the terminal device T is connected to the server S, and uploads the logistics data to the server S to compare the logistics data with delivery data D10. In one embodiment, the terminal device T is installed with an application (APP) for connecting to the server S or the electronic paper display 200. If the logistics data does not match all the delivery data D10 in the server S, it means that the logistics box 100 has not been used and is in an "available" state.

In some embodiments, after confirming that the logistics box 100 is in the "available" state, the server S adds the logistics data as a new delivery data D10, or the server S updates the delivery data D10 according to the logistics data. At the same time, the server S set the progress data D11 to "registration" state.

In some other embodiments, when confirming that the logistics box 100 is in the "available" state, the server S assigns or generates a new delivery data D10, and the server S stores the delivery data in the memory 240 through the connection between the terminal device T and the electronic paper display 200 as an updated "logistics data." In other words, the server S updates the logistics data according to one of the delivery data D10 (e.g., a delivery data D10 that has registered but has not been assigned to the logistics box 100.) At the same time, the logistics barcode of the electronic paper display 200 is updated according to the updated logistics data. Then, the server S sets the corresponding progress data D11 as "registration".

In step S403, after confirming that the logistics box 100 is in the "available" state, the terminal device T sends an unlock message to the electronic paper display 200, a processing device 250 of the electronic paper display 200 controls the electronic lock 103 of the logistics box 100 to unlock to open the logistics box 100. At this time, the sender places the item in the logistics box 100. After placing the item, the sender locks the electronic lock 103 by the terminal device T. In other words, when the terminal device T is connected to the logistics box 100/the electronic paper display 200 according to the connection data, the terminal device T controls the electronic lock 103 to lock or unlock by the electronic paper display 200, so as to open or close the logistics box 100.

Step S404 is used to illustrate the "check process". In step S404, when the logistics staff receives the packaged logistics box 100, the logistics staff use the terminal device T (this is still illustrated in FIG. 2, it is important to mention that the terminal device T is different in different process) to scan the logistics barcode to obtain the logistics data. The terminal device T uploads the logistics data to the server S. The server S identifies a corresponding code of the terminal device T (e.g., the login ID) and the delivery data D10 corresponding to the logistics data. Therefore, the server updates the progress data D11 accordingly, for example, update the progress data D11 from "registration process" to "check process".

Step S405 is similar to step S404, when a delivery staff receives the logistics box 100, the delivery staff uses the terminal device T to scan the logistics barcode to obtain the logistics data. The terminal device T uploads the logistics data to the server S. The server S identifies the corresponding code of the terminal device T and the delivery data D10 corresponding to the logistics data to update the progress data D11. For example, update the progress data D11 from "check process" to "delivery process".

As shown in FIG. 4B, steps S406-S410 are used to illustrate the "delivery process". In step S406, the sensing device 220 periodically obtains a state parameter of the logistics box 100 by at least one internal sensor. In step S407, the processing device 250 generates a sensing signal according to at least one state parameter obtained by the sensing device 220. In addition to values sensed by the sensing device 220 (i.e., parameters such as temperature, humidity, brightness, etc.), the sensing signal further includes a logistics data (e.g., registration number). The processing device 250 periodically sends the sensing signal through the wireless transmission circuit 252. Therefore, the delivery staff can confirm the current state of the logistics box 100 by the terminal device T at any time.

In step S408, the processing device 250 determines whether any of the sensing signal exceeds a corresponding state threshold stored in the memory 240. In other words, the processing device 250 is configured to compare the sensing signal with the corresponding state threshold. In some other embodiments, the state threshold is stored in the terminal device T, and the determination/comparison can be executed by the terminal device T.

If any of the sensing signals exceeds the state threshold, performing step S409. In step S409, the processing device 250 drives a motor 260 or a buzzer 270 to generate vibration or a reminder sound. In some other embodiments, the processing device 250 controls the display panel 210 of the electronic paper display 200 to generate a reminder pattern, or send an abnormal signal.

In step S410, the terminal device T is connected to the server S to upload the received sensing signal to the server S. The server S finds the delivery data D10 corresponding to the logistics data, and selectively updates the state data D12 in the delivery data D10 according to the sensing signal (e.g., records "current temperature is 15° C."). Accordingly, the sender or the recipient can connect to the server S at any time to confirm the current delivery progress and item state.

Step S411 is used to illustrate the "receiving process". In step S411, after the recipient receives the logistics box 100, the recipient uses the terminal device T to scan the logistics barcode to obtain the logistics data. At this time, the recipient connects to the server S by the terminal device T to verify identity (e.g., enter account and password). After verifying the identity, the server S sends an unlock message to the terminal device T, so that the terminal device T remotely controls the electronic lock of the logistics box 100 to unlock. At the same time, the server S updates the progress data D11, such as updating the progress data D11 from "delivery" to "completed".

The present disclosure uses the electronic paper display 200 to replace the traditional paper form. In addition to reducing paper consumption and avoiding manual receipt, it can also be integrated with the cloud data (e.g., delivery data D10) of the server S for easy management. Furthermore, the electronic paper display 200 can also display more detailed information or messages at any time according to logistics needs.

The present disclosure uses the sensing device 220 to detect/sense state of the logistics box 100 at any time or periodically, and uploads the sensing signal to the server S through wireless transmission technology. Accordingly, the server S will be able to record current state of each logistics box 100 for the logistician, the sender or the recipient to confirm at any time.

It will be apparent to those skilled in the art that various modifications and variations can be made to the structure of the present disclosure without departing from the scope or spirit of the present disclosure. In view of the foregoing, it is intended that the present disclosure cover modifications and variations of this present disclosure provided they fall within the scope of the following claims.

What is claimed is:
1. An electronic paper display, comprising:
a carrier device arranged on a logistics box;
a memory arranged on the carrier device, and configured to store a logistics data;
a display panel arranged on the carrier device, and configured to generate a control voltage according to the logistics data to adjust a plurality of positions of a plurality of electrophoretic particles;
a sensing device comprising at least one sensor, and configured to sense at least one state parameter of the logistics box to generate at least one sensing signal; and
a processing device coupled to the memory, the display panel and the sensing device, and configured to send the at least one sensing signal through wireless transmission technology;
wherein the memory is configured to store a state threshold, the processing device is configured to determine whether a value of the at least one sensing signal exceeds the state threshold.

2. The electronic paper display of claim 1, wherein the at least one sensor is a gravity sensor, a light sensor, a temperature sensor or a humidity sensor, and the processing device periodically sends the at least one sensing signal.

3. The electronic paper display of claim 1, wherein the display panel is configured to adjust the plurality of positions of the plurality of electrophoretic particles according to the logistics data to display a logistics barcode.

4. The electronic paper display of claim 1, further comprises:
a motor coupled to the processing device, wherein when the processing device determines that the value of the at least one sensing signal exceeds the state threshold, the processing device is configured to drive the motor to generate vibration.

5. The electronic paper display of claim 1, wherein the memory is configured to store a reminder data, when the processing device determines that the value of the at least one sensing signal exceeds the state threshold, the processing device is configured to control the display panel to display a reminder pattern corresponding to the reminder data.

6. A logistics box, comprising:
a box body;
a sensing device arranged on the box body, and comprising at least one sensor to sense at least one state parameter of the logistics box to generate at least one sensing signal; and
an electronic paper display arranged on a surface of the box body, and coupled to the sensing device, wherein the electronic paper display is configured to control a plurality of positions of a plurality of electrophoretic particles to display a logistics barcode;
wherein the electronic paper display is further configured to send the at least one sensing signal through wireless transmission technology;
wherein the electronic paper display is configured to store a state threshold, the electronic paper display is configured to determine whether a value of the at least one sensing signal exceeds the state threshold.

7. The logistics box of claim 6, wherein the at least one sensor is a gravity sensor, a light sensor, a temperature sensor or a humidity sensor, and the processing device periodically sends the at least one sensing signal.

8. The logistics box of claim 6, wherein the electronic paper display further comprises:
a battery; and
a processing device coupled to the battery, and configured to periodically detect a remaining power of the battery; wherein when the processing device determines that the remaining power of the battery is lower than a set value, the processing device is configured to send a warning signal.

9. The logistics box of claim 6, wherein the electronic paper display further comprises:
a motor; and
a processing device coupled to the motor, wherein when the processing device determines that the value of the at least one sensing signal exceeds the state threshold, the processing device is configured to drive the motor to generate vibration.

10. The logistics box of claim 6, wherein the electronic paper display further comprises:
a memory configured to store a logistics data and a reminder data; and
a processing device coupled to the memory, wherein when the processing device determines that the value of the at least one sensing signal exceeds the state threshold, the processing device is configured to control the electronic paper display to display a reminder pattern corresponding to the reminder data.

11. A logistics state management method, comprising:
displaying, by an electronic paper display, a logistics barcode, wherein the electronic paper display is arranged on a box body;
scanning, by a terminal device, the logistics barcode to obtain a logistics data;
connecting, by the terminal device, to a server, and finding a progress data corresponding to the logistics data in the server, so as to selectively update the progress data;
sensing, by at least one sensor of a sensing device, at least one state parameter of a logistics box to generate at least one sensing signal;
sending, by a wireless transmission circuit, the at least one sensing signal; and
comparing the at least one sensing signal with a state threshold;
when the at least one sensing signal exceeds the state threshold, driving a motor or a buzzer.

12. The logistics state management method of claim 11, further comprises:
scanning, by the terminal device, the logistics barcode to obtain a connection data; and
connecting, by the terminal device, to the electronic paper display according to the connection data to control an electronic lock of the logistics box.

13. The logistics state management method of claim 11, further comprises:
connecting, by the terminal device, to the server, and finding a state data corresponding to the logistics data in the server, so as to selectively update the state data according to the at least one sensing signal.

14. The logistics state management method of claim 11, further comprises:
comparing the at least one sensing signal with a state threshold; and
when the at least one sensing signal exceeds the state threshold, controlling the electronic paper display to display a reminder pattern.

* * * * *